United States Patent
Ho et al.

(10) Patent No.: US 7,768,609 B2
(45) Date of Patent: Aug. 3, 2010

(54) PIXEL STRUCTURE FOR A DISPLAY DEVICE HAVING A COMMON LINE WITH A CAPACITOR PORTION THAT EXTENDS DIAGONALLY TO THE PIXEL ELECTRODE EDGE AND IS ALSO PERPENDICULAR TO THE ALIGNMENT DIRECTION

(75) Inventors: I-Lin Ho, Tainan (TW); Chien-Hong Chen, Tainan (TW); Chien-Cheng Liu, Tainan (TW); Yu-Chien Kao, Tainan (TW)

(73) Assignee: Chimei Innolux Corporation (TW)

( * ) Notice: Subject to any disclaimer, the term of this patent is extended or adjusted under 35 U.S.C. 154(b) by 312 days.

(21) Appl. No.: 11/973,909

(22) Filed: Oct. 12, 2007

(65) Prior Publication Data

US 2008/0094532 A1   Apr. 24, 2008

(30) Foreign Application Priority Data

Oct. 14, 2006 (TW) ............................. 95137858 A

(51) Int. Cl.
*G02F 1/1337* (2006.01)
*G02F 1/1343* (2006.01)

(52) U.S. Cl. ............................ 349/123; 349/38; 349/39
(58) Field of Classification Search ................ 349/38, 349/39, 123, 124
See application file for complete search history.

(56) References Cited

U.S. PATENT DOCUMENTS

2005/0105035 A1 *   5/2005   Wu et al. ................... 349/145
2006/0232720 A1 *  10/2006   Lee et al. .................... 349/38

* cited by examiner

*Primary Examiner*—John Heyman
(74) *Attorney, Agent, or Firm*—Trop Pruner & Hu, P.C.

(57) ABSTRACT

A pixel structure to be disposed on a substrate is provided. The pixel structure includes a common line having a capacitor portion, an active device, a pixel electrode electrically connected to the active device and covering the capacitor portion, and an alignment layer covering at least the common line. The alignment layer has an alignment direction and the capacitor portion extends along a first direction that is substantially perpendicular to the alignment direction.

18 Claims, 8 Drawing Sheets

US 7,768,609 B2

PIXEL STRUCTURE FOR A DISPLAY DEVICE HAVING A COMMON LINE WITH A CAPACITOR PORTION THAT EXTENDS DIAGONALLY TO THE PIXEL ELECTRODE EDGE AND IS ALSO PERPENDICULAR TO THE ALIGNMENT DIRECTION

CROSS-REFERENCE TO RELATED APPLICATION

This claims priority under 35 U.S.C. §119 of Taiwan patent application No. 095137858, filed Oct. 14, 2006, which is hereby incorporated by reference.

TECHNICAL FIELD

The present invention relates to a display device, and more particularly to a pixel structure of a display device.

BACKGROUND

A liquid crystal display (LCD) device is a flat panel display device that includes a liquid crystal layer sandwiched between two substrates, where one of the substrates can be an active device substrate that has an array of active devices (e.g., thin film transistors or TFTs) to control application of electric fields in corresponding pixel areas of the LCD device.

In conventional LCD devices, light leakage may occur at storage capacitors (Cst) in the pixel areas. FIG. 1 is a schematic view of a pixel structure P1 in a pixel area of a conventional LCD device. The pixel structure P1 includes a substrate 100, a data line 102, a scan line 104, a pixel electrode 106, a common line 108, and an active device (e.g., TFT) T1 disposed on the substrate 100. The common line 108 has a capacitor portion 108a and a connector portion 108b, and the active device T1 is electrically connected to the scan line 102 and the data line 104. The scan line 102 controls activation/deactivation of the active device T1, and the data line 104 provides a data voltage that is to be applied to the pixel electrode 106 when the corresponding active device T1 is activated. The pixel electrode 106 is electrically connected to the active device T1 and covers the capacitor portion 108a, and the overlapped part of the pixel electrode 106 and the capacitor portion 108a forms a storage capacitor (Cst). To enhance the storage capacity of the storage capacitor, a capacitor electrode 110 is provided above the capacitor portion 108a of the common line 108. The capacitor electrode 110 is disposed between the pixel electrode 106 and the capacitor portion 108a, and is electrically connected to the pixel electrode 106. In addition, an alignment layer (not shown) is also disposed on the substrate 100 and covers the aforementioned elements. In FIG. 1, Dc1 represents a direction in which the capacitor portion 108a extends, and Da1 represents an alignment direction of the alignment layer.

Since there are more film layers in a region (e.g., region A10) of the substrate 100 where the common line 108 is located than in other regions, the alignment layer covering the substrate 100 will have a portion in the region A10 that protrudes higher than the remaining portions of the alignment layer on the two sides of region A10 defined by the common line 108, which can cause a fringe field in the region A10. As a result, liquid crystal molecules in the region A10 may be oriented in an incorrect manner, different from the orientation of liquid crystal molecules in other regions of the same pixel region, thereby causing light leakage in the region A10. As a result, the display contrast may be reduced, thereby causing a poor display effect of the LCD device.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 2A:
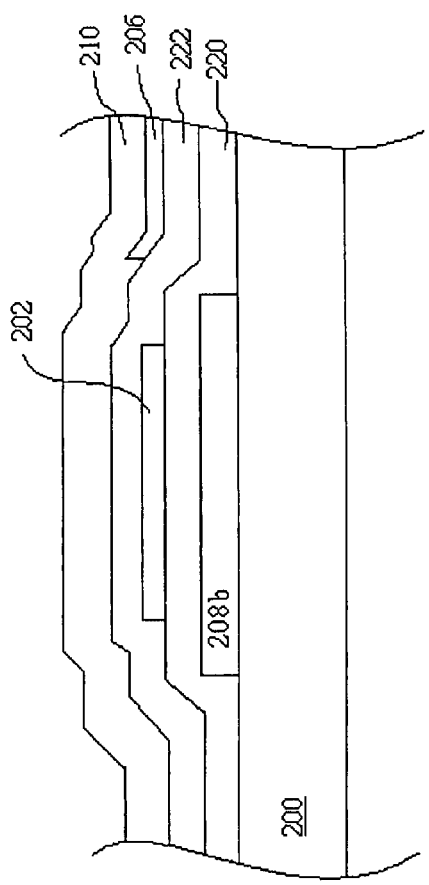
FIGS. 2A and 2B are cross-sectional views of respective sections of the pixel structure of FIG. 2.
Figure 2B:
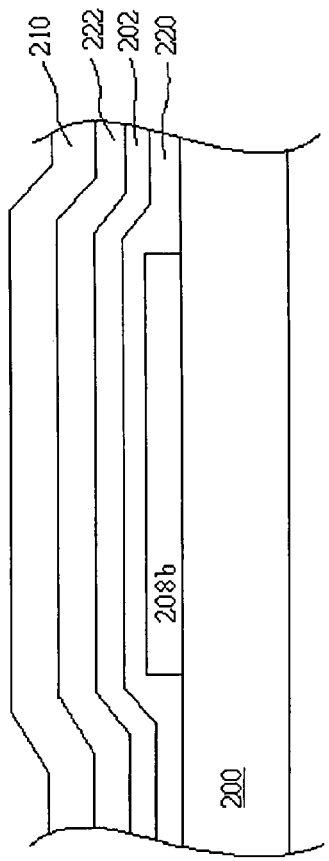
Figure 2:
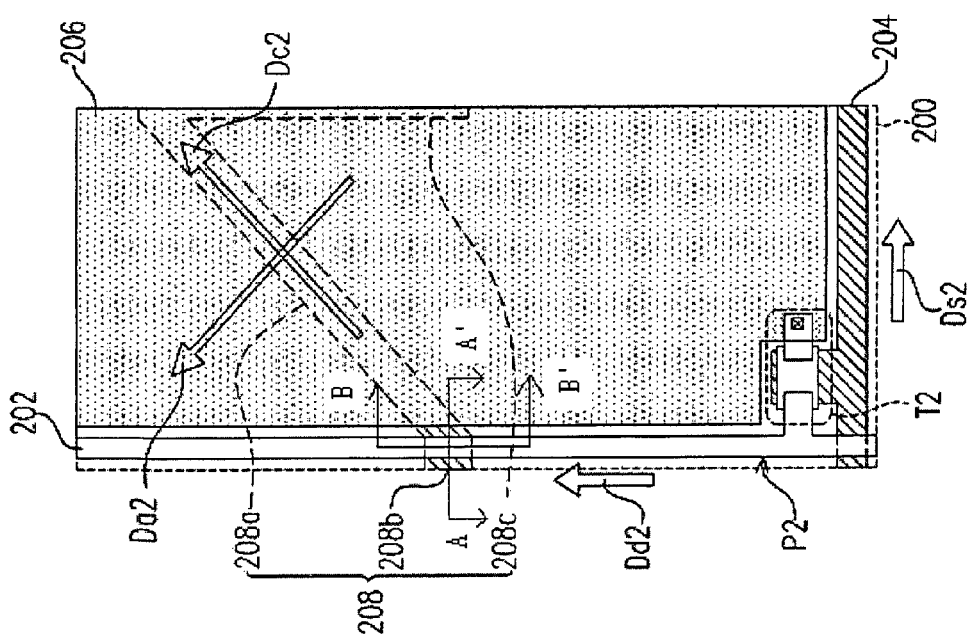
FIG. 2 is a schematic view of a pixel structure according to an embodiment of the present invention.

FIG. 2 is a schematic view of a pixel structure P2 according to an embodiment of the present invention. Referring to FIG. 2, the pixel structure P2 is disposed on a substrate 200, and the pixel structure P2 includes a data line 202, a scan line 204, a pixel electrode 206, a common line 208, an active device (e.g., TFT) T2, and an alignment layer 210 (not shown in FIG. 2 but shown in FIG. 2A and FIG. 2B, described below). The pixel structure P2 is provided in one pixel area among a plurality of pixel areas. The plurality of pixel areas are arranged as an array, with the pixel areas defined by intersections of scan lines and data lines.

A first structure (e.g., pixel structure P2) is considered to be "on" or "disposed on" a second structure (e.g., substrate 200) if the first structure is directly in contact with the second structure, or alternatively, if the first structure is above the second structure, with one or more intervening structures in between.

The common line 208 has a capacitor portion 208a that provides an electrode of a storage capacitor. The data line 202, the scan line 204, the pixel electrode 206, the common line 208, the active device T2, and the alignment layer 210 are all disposed on the substrate 200. The active device T2 is electrically connected to the data line 202 and the scan line 204. The pixel electrode 206 is electrically connected to the active device T2 and covers the capacitor portion 208a. The alignment layer 210 covers the data line 202, the scan line 204, the pixel electrode 206, the common line 208, and the active device T2. A first structure (e.g., alignment layer 210) "covers" a second structure (e.g., any of data line 202, scan line 204, pixel electrode 206, common line 208, active device T2) if there is some overlap between the first and second structures, regardless of whether the first structure is above the second structure or vice versa.

The alignment layer 210 covering the pixel electrode 206 has an alignment direction Da2, and the capacitor portion 208a extends along a direction Dc2. The alignment layer 210 is used to pre-tilt liquid crystal molecules of a liquid crystal along a given direction in the absence of an applied electric field. The data line 202 extends along a first direction Dd2, and the scan line 204 extends along a second direction Ds2 that is generally perpendicular to Dd2. In this embodiment, the alignment direction Da2 of the alignment layer 210 is substantially perpendicular to the direction Dc2 in which the capacitor portion 208a extends, and an angle between the first direction Dd2 of the data line 202 and the direction Dc2 of the capacitor portion 208a is substantially about 45°. It should be noted that the fringe of the capacitor portion 208a, for example, extends along the direction Dc2. "Substantially perpendicular" refers to an angle that is between 85° and 95°, for example, and "perpendicular" refers to a 90° angle.

In the FIG. 2 embodiment, the common line 208 further includes a first connector portion 208b and a second connector portion 208c. The first connector portion 208b crosses the data line 202 (without contacting the data line 202) in the same pixel area, and the two ends of the first connector portion 208b are respectively connected to a first end of the capacitor portion 208a in the same pixel area and one end of the second connector portion 208c (not shown in FIG. 2) in the adjacent pixel area.

A cross-sectional view of a section of the pixel structure P2 of FIG. 2 along A-A' is depicted in FIG. 2A, and a cross-section view of another section of the pixel structure P2 along B-B' is depicted in FIG. 2B. As shown in FIGS. 2A and 2B, the first connector portion 208b is a first conductive layer disposed on the substrate 200. A gate insulating layer 220 is provided over the first connector portion 208b. The data line 202 crosses over the first connector portion 208b in the depicted implementation, with the gate insulating layer 220 between the data line 202 and the first connector portion 208b. An insulating passivation layer 222 is disposed over the data line 202. The pixel electrode 206 is disposed on the passivation layer 222. The alignment layer 210 is disposed on the aforementioned elements.

Referring again to FIG. 2, the second connector portion 208c extends along the first direction Dd2 (which is also the direction of the data line 202), and the two ends of the second connector portion 208c are respectively connected to a second end of the capacitor portion 208a in the same pixel area and one end of the first connector portion 208b (not shown in FIG. 2) in the next pixel area. Effectively, the second end of the capacitor portion 208a is connected to one end of the second connector portion 208c, and the first end of the capacitor portion 208a is connected to the first connector portion 208b.

In the illustrated implementation, the capacitor portion and the connector portions of the common line 208 are each connected at the ends. However, in other implementations, the capacitor portion and the connector portions do not each have to be connected at the ends.

Figure 1:
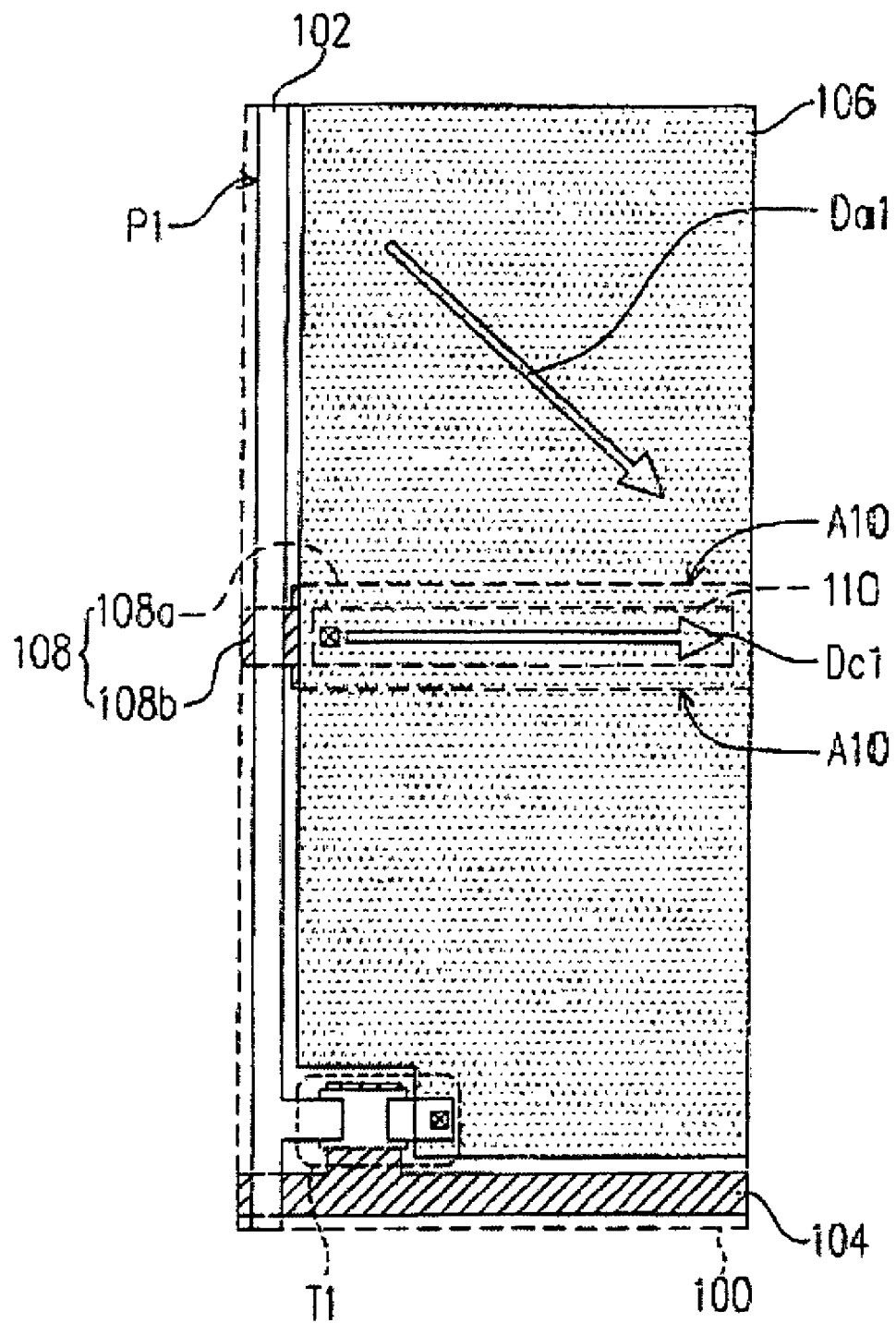
FIG. 1 is a schematic view of a conventional pixel structure in a liquid crystal display (LCD) device.

As noted above, in the FIG. 2 embodiment, the alignment direction Da2 of the alignment layer 210 is substantially perpendicular (between 85° and 95°, for example) to the extending direction Dc2 of the capacitor portion, which is different from the arrangement of the conventional pixel structure P1 of FIG. 1 in which the angle between the capacitor portion of the common line and the alignment direction of the alignment layer is 45°. The pixel structure P2 in FIG. 2A can effectively eliminate or reduce the light leakage phenomenon on both sides of the capacitor portion 208a.

Figure 3A:
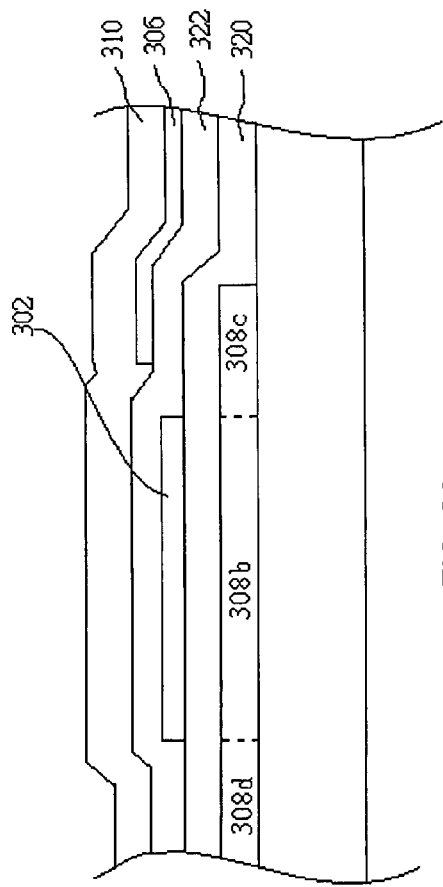
FIGS. 3A and 3B are cross-sectional views of respective sections of the pixel structure of FIG. 3.
Figure 3B:
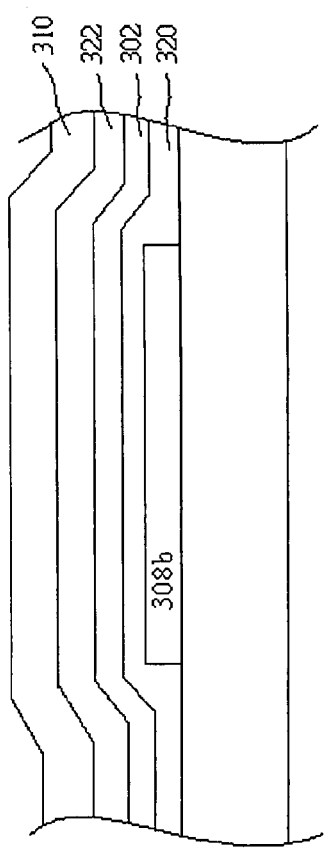
Figure 3:
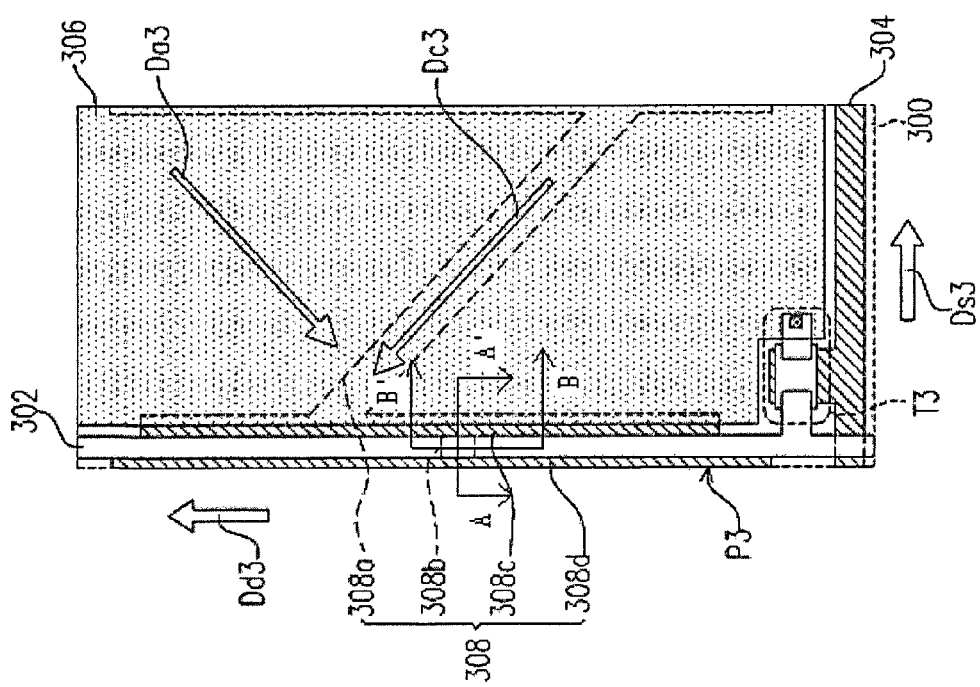
FIG. 3 is a schematic view of a pixel structure according to another embodiment of the present invention.

FIG. 3 is a schematic view of the pixel structure P3 according to another embodiment of the present invention. The pixel structure P3 is similar to the pixel structure P2 in the FIG. 2 embodiment, but the structure of the common line 308 in the pixel structure P3 is different from that of the common line 208 in the pixel structure P2.

As shown in FIG. 3, the common line 308 includes a first connector portion 308b that crosses the data line 302, and the two ends of the first connector portion 308b are connected to a second connector portion 308c and a third connector portion 308d, respectively. This is better depicted in FIG. 3A, which shows a cross-section of the pixel structure P3 of FIG. 3 along A-A'. As further depicted in FIGS. 3A and 3B (cross-section along B-B' in FIG. 3), a gate insulating film 320 is disposed between the connector portions 308b, 308c, 308d and the data line 302, and a passivation layer 322 is disposed on the data line 302. The pixel electrode 306 is disposed on the passivation layer 322. The second connector portion 308c is between a data line 302 and a pixel electrode 306, and is connected to the first connector portion 308b and a capacitor portion 308a of the common line 308. The third connector portion 308d is at the other side of the data line 302 opposite from the second connector portion 308c, and is connected to the corresponding capacitor portion in the adjacent pixel area and the first connector portion 308b.

The structure formed by the first connector portion 308b, the second connector portion 308c and the third connector portion 308d in this example is substantially shaped like an "H". As depicted, the first connector portion 308b, the second connector portion 308c, and the third connector portion 308d are not connected at their top and bottom ends when viewed in the diagram.

In this embodiment, the pixel structure P3 has an alignment layer 310 with an alignment direction Da3. The common line capacitor portion 308a extends in a direction Dc3 that is substantially perpendicular to the alignment direction Da3, which helps alleviate the light leakage phenomenon at both sides of the capacitor portion 308a. Note that the alignment direction Da3 of the pixel structure P3 is different from the alignment direction Da2 in the pixel structure P2 of FIG. 2. However, the alignment direction Da3 is suitable as long as it is substantially perpendicular to the extending direction Dc3 of the capacitor portion 308a.

Figure 4:
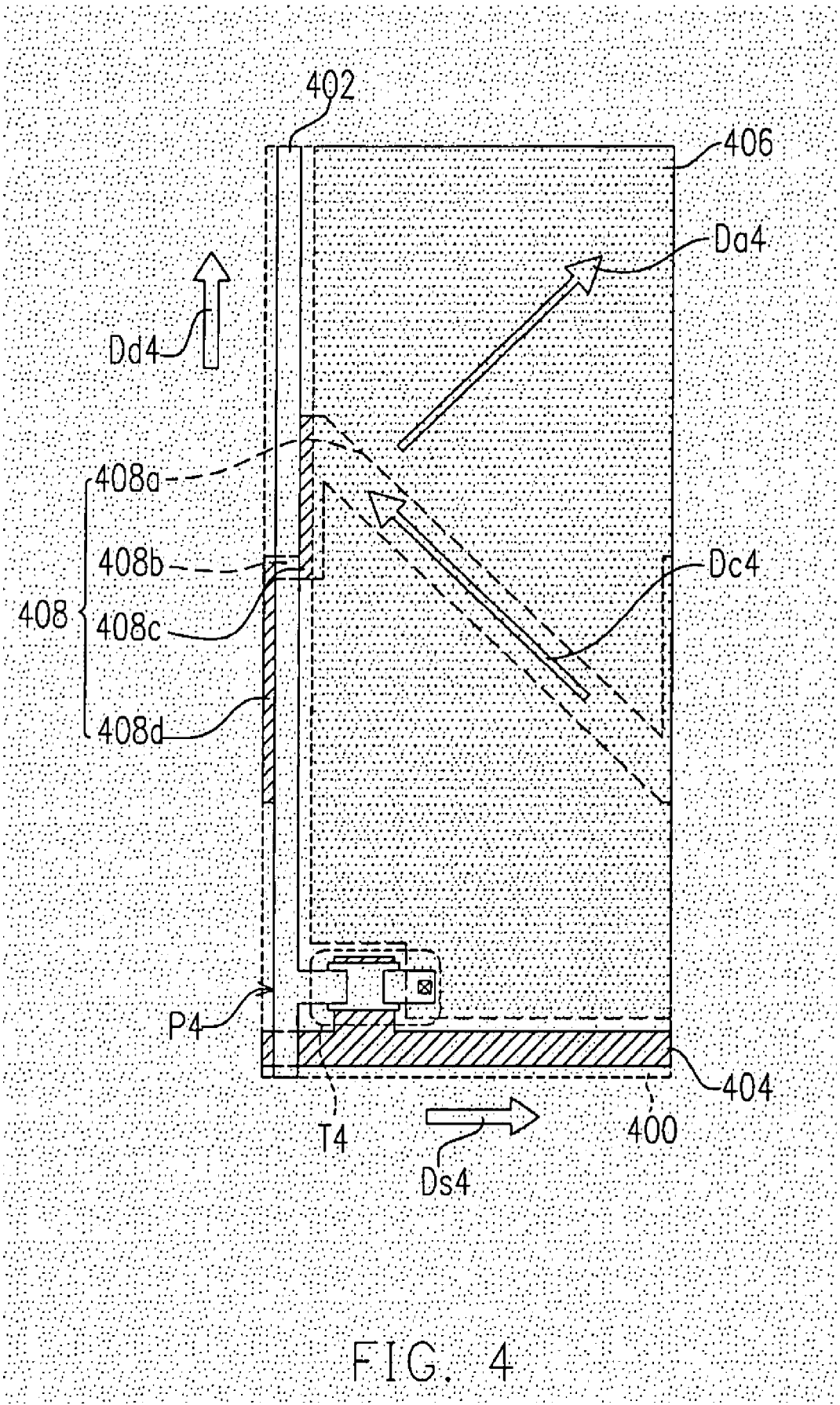
FIGS. 4-6 are schematic views of pixel structures according to other embodiments.

FIG. 4 is a schematic view of a pixel structure P4 according to another embodiment of the present invention. The pixel structure P4 in this embodiment is similar to the pixel structure P2 in the FIG. 2 embodiment, but the main difference is that the structure of the common line 408 in the pixel structure P4 is changed in some aspects.

The common line 408 has a first connector portion 408b, a second connector portion 408c, and a third connector portion 408d. However, in this embodiment, the two ends of the first connector portion 408b are respectively connected to the ends of the second connector portion 408c and the third connector portion 408d. The two ends of the second connector portion 408c are respectively connected to an end of the first connector portion 408b and an end part of the capacitor portion 408a in the corresponding pixel area. Furthermore, the two ends of the third connector portion 408d are respectively connected to the first connector portion 408b and an end part of the capacitor portion in the adjacent pixel area. The structure made up of the connector portions 408b, 408c, 408d generally has a Z-shape.

In the FIG. 4 embodiment, except for the structure of the common line 408 being changed in some aspects with respect to the pixel structure P2, the pixel structure P4 still has an alignment direction (Da4) of the alignment layer and an extending direction (Dc4) of the capacitor portion 408a which are substantially perpendicular to each other. Therefore, the light leakage phenomenon at both sides of the capacitor portion 408a may be alleviated.

Figure 5:
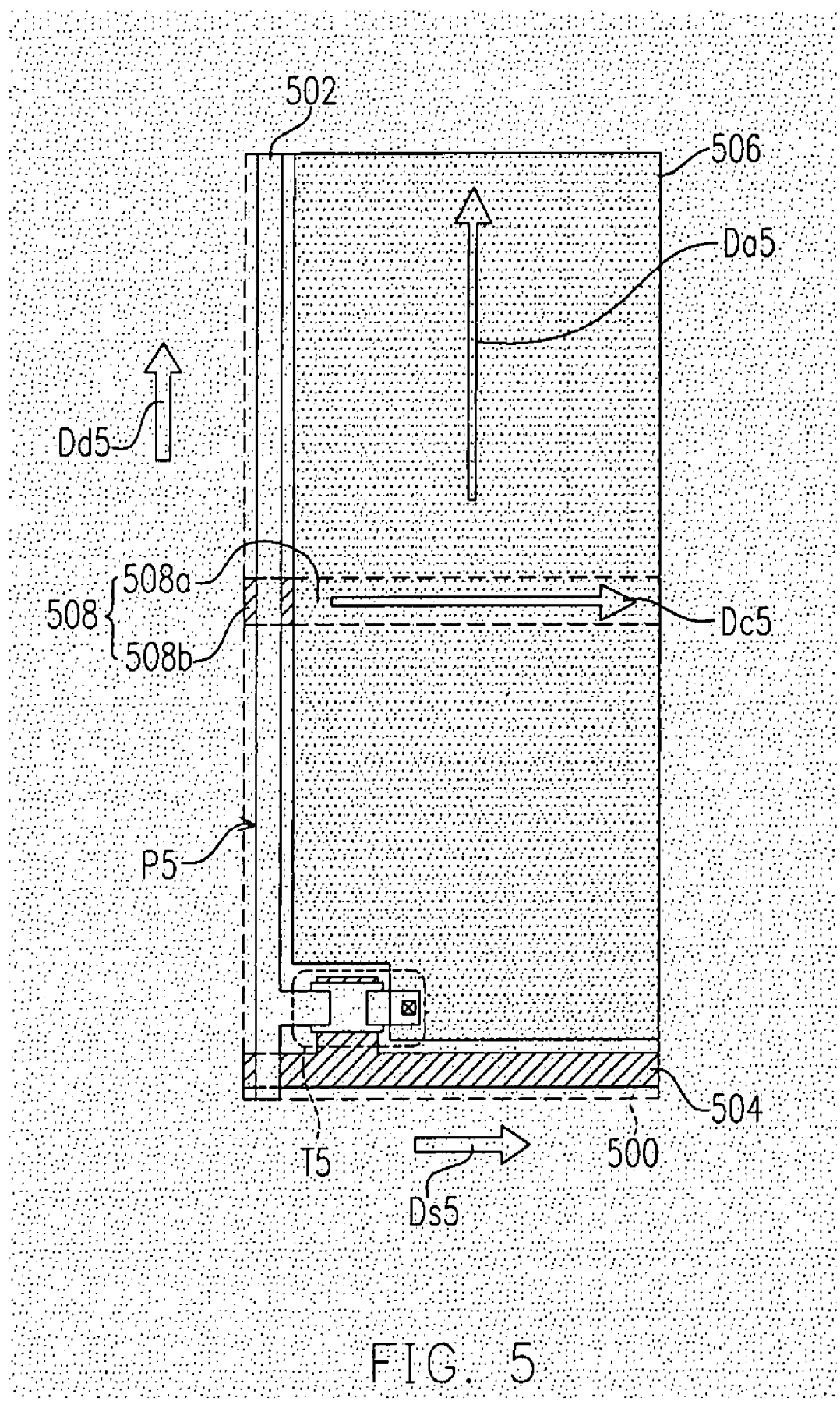

FIG. 5 is a schematic view of the pixel structure P5 according to still another embodiment of the present invention. In the pixel structure P5, a data line 502 extends along a first direction Dd5, a scan line 504 extends along a second direction Ds5, and an alignment layer has an alignment direction Da5. An extending direction Dc5 of a capacitor portion 508a of the common line 508 is substantially perpendicular to the first direction Dd5 of the data line 502. A connector portion 508b of the common line 508 passes through the corresponding data line 502. The second direction Ds5 of the scan line 504 is substantially perpendicular to the alignment direction Da5 of the alignment layer. Furthermore, the alignment direction Da5 of the alignment layer is also substantially perpendicular to the extending direction Dc5 of the capacitor portion 508a. Therefore, the light leakage phenomenon at both sides of the capacitor portion 508a may also be alleviated.

Figure 6:
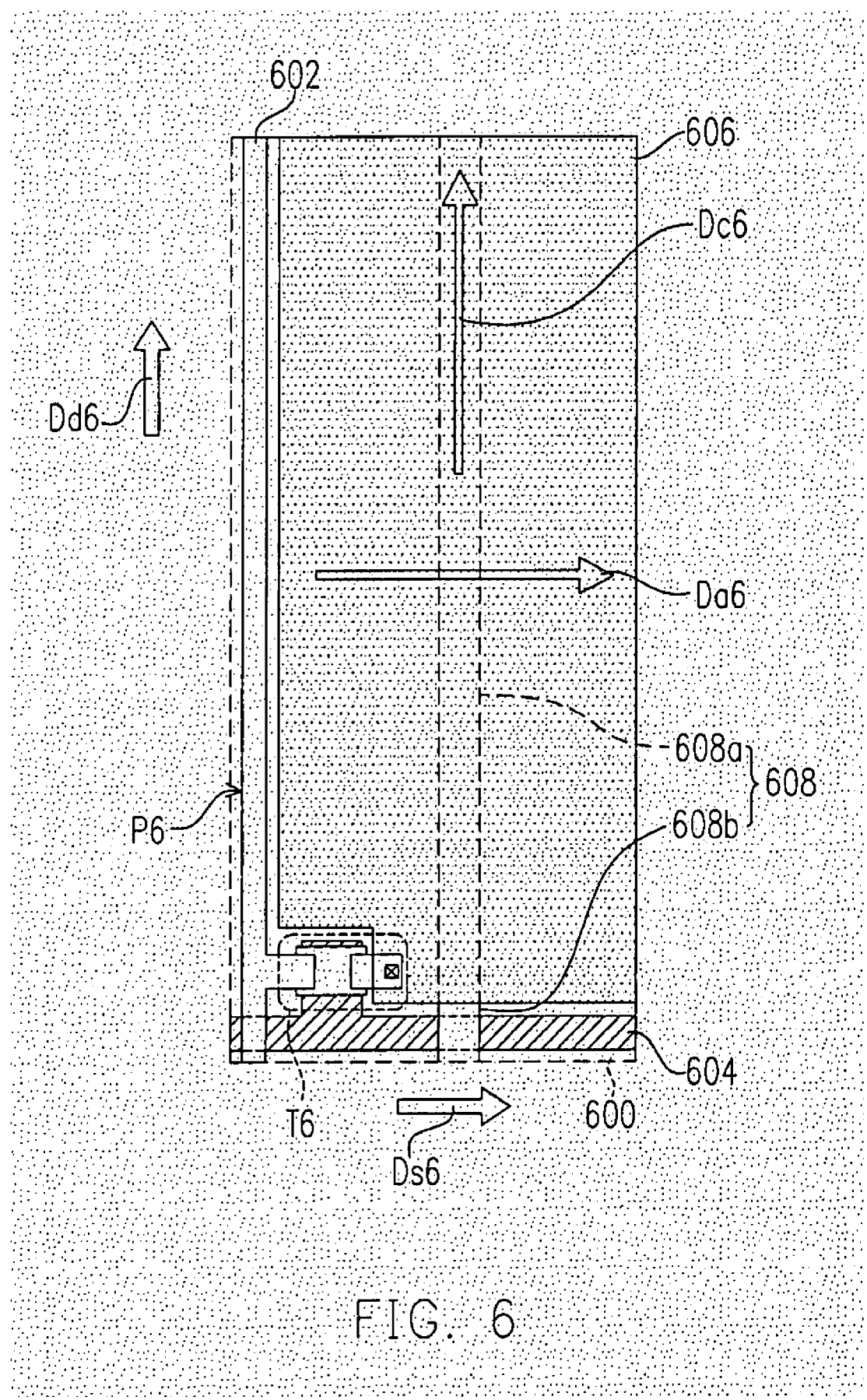

FIG. 6 is a schematic view of a pixel structure P6 according to a further embodiment of the present invention. In the pixel structure P6, a data line 602 extends along a first direction Dd6, and a scan line 604 extends along a second direction Ds6. An extending direction of a capacitor portion 608a of a common line 608 is substantially parallel to the first direction Dd6, while a connector portion 608b of the common line 608 crosses the corresponding scan line 604. The alignment layer has an alignment direction Da6, and the second direction Ds6 is substantially parallel to the alignment direction Da6 of the alignment layer. Furthermore, the alignment direction Da6 of the alignment layer is also substantially perpendicular to the extending direction Dc6 of the capacitor portion 608a. Therefore, the light leakage phenomenon at both sides of the capacitor portion 608a may also be alleviated.

As discussed above, the structure of the common line of a pixel structure can be adjusted according to the design requirements of different display panels. Therefore, the pixel structure according to some embodiments can be used in a variety of display panels to efficiently enhance the contrast and display effects of an LCD.

Figure 7:
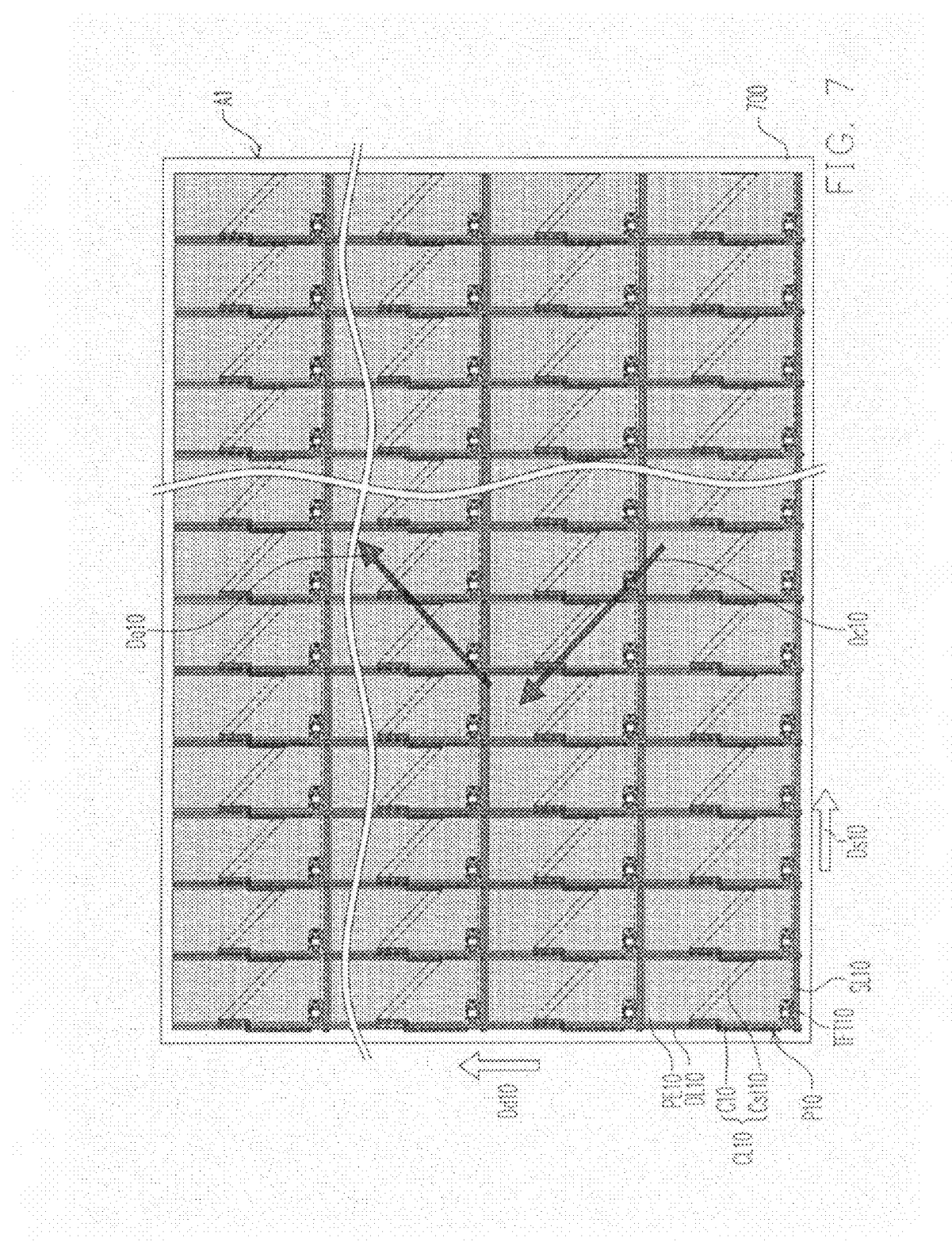
FIG. 7 is a schematic view of a pixel array substrate according to an embodiment of the present invention.

FIG. 7 is a schematic view of the pixel array substrate A1 according to an embodiment of the present invention. The pixel array substrate A1 includes a substrate 700, a plurality of data lines DL10, a plurality of scan lines SL10, a plurality of common lines CL10, a plurality of active devices TFT10, a plurality of pixel electrodes PE10, and a first alignment layer (not shown).

The plurality of data lines DL10, the plurality of scan lines SL10, the plurality of common lines CL10, the plurality of active devices TFT10, and the plurality of pixel electrodes PE10 are all disposed on the substrate 700. The plurality of data lines DL10 and the plurality of scan lines SL10 define an array of pixel areas P10. Each of the common lines CL10 has capacitor portion Cst10 and a connector portion C10. Each capacitor portion Cst10 is disposed in a respective pixel area P10. Each connector portion C10 is connected between two adjacent capacitor portions Cst10 of two corresponding adjacent pixel areas P10. Furthermore, the pixel electrodes PE10 disposed in corresponding pixel areas P10 are electrically connected to corresponding active devices TFT10, and cover corresponding capacitor portions Cst10. Additionally, the first alignment layer is disposed on the substrate 700 and covers the aforementioned elements.

The capacitor portions Cst10 extend generally along a common direction Dc10. The fringes of the capacitor portions Cst10, for example, extend along the direction Dc10. Furthermore, the first alignment layer has an alignment direction Da10, the data lines DL10 extend along a first direction Dd10, and the scan lines SL10 extend along a second direction Ds10. The alignment direction Da10 of the first alignment layer is substantially perpendicular to the extending direction Dc10 of the capacitor portion Cst10, so as to alleviate the light leakage phenomenon at both sides of the capacitor portions Cst10. Furthermore, in this embodiment, the first direction Dd10 of the data lines is perpendicular to the second direction Ds10 of the scan lines, and the included angle between the first direction Dd10 and the extending direction Dc10 is about 45°.

Each pixel structure used in the pixel array substrate A1 can be any one of the pixel structures P2-P6 described above. More generally, each pixel structure in the pixel array substrate A1 has an alignment layer with an alignment direction that is substantially perpendicular to the extending direction of the common electrode capacitor portion.

Figure 8:
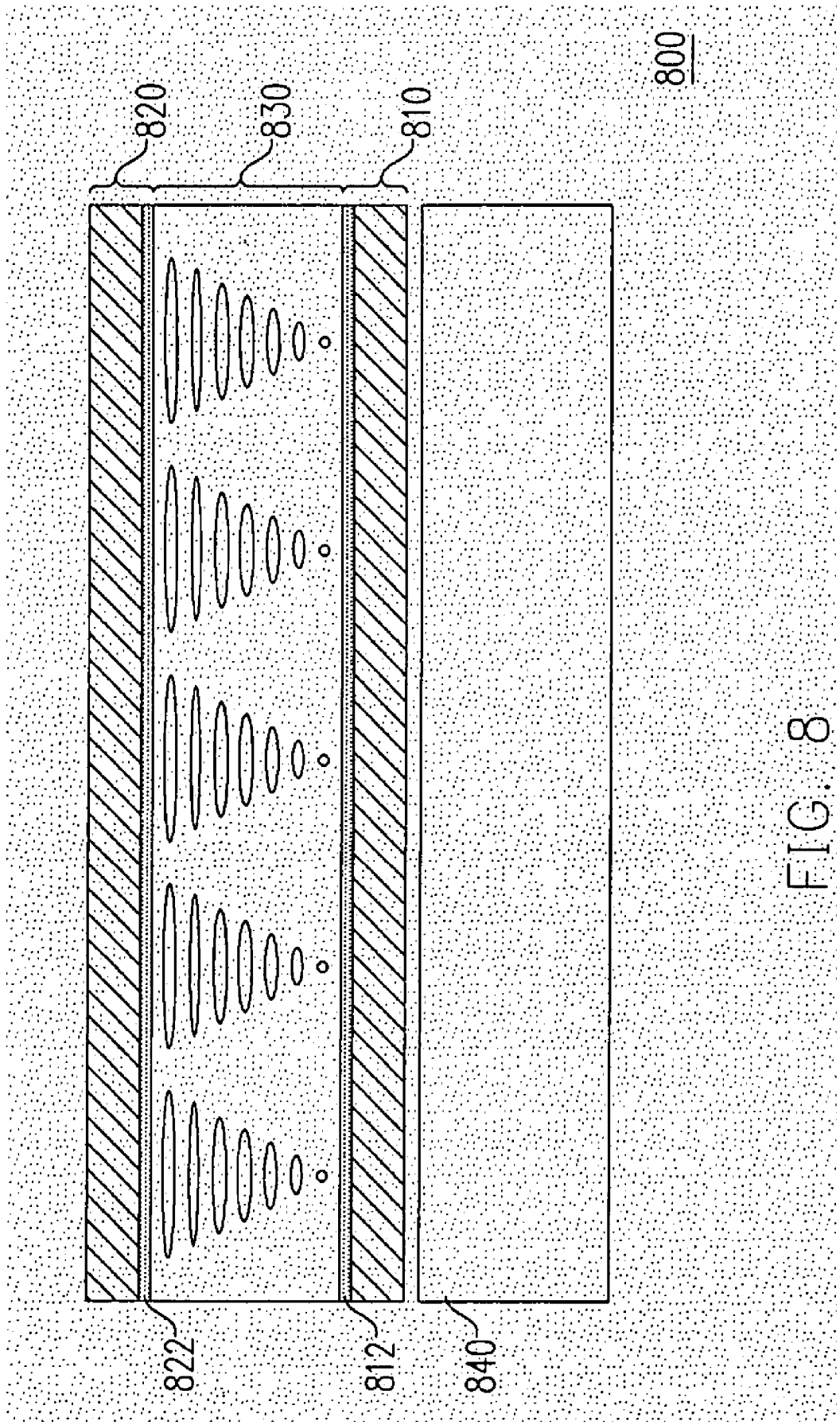
FIG. 8 is a sectional view of an LCD device according to an embodiment of the present invention.

FIG. 8 is a sectional view of an LCD device 800 according to an embodiment of the present invention. The LCD device 800 includes a pixel array substrate 810, an opposite substrate 820, and a liquid crystal layer 830.

The pixel array substrate 810 may be the pixel array substrate A1 of FIG. 7. The pixel array substrate 810 has a first alignment layer 812 and common line capacitor portions (not shown in FIG. 8). The pixel array substrate 810 is characterized in that the alignment direction of the first alignment layer 812 is substantially perpendicular to the extending direction of the capacitor portions.

Furthermore, in the depicted embodiment, the opposite substrate 820 is disposed above the pixel array substrate 810. The liquid crystal layer 830 is disposed between the opposite substrate 820 and the pixel array substrate 810. The opposite substrate 820 has a second alignment layer 822 contacting the liquid crystal layer 830, and the second alignment layer 822 has a second alignment direction (not shown). The first alignment direction can be substantially perpendicular to the second alignment direction. In addition, the LCD device 800 in this embodiment may have a twisted nematic (TN) design in that the liquid crystal layer 830 is aligned horizontally.

If the LCD device 800 is a transmissive LCD or a transflective LCD, the pixel array substrate 810, the opposite substrate 820, and the liquid crystal layer 830 are disposed on a backlight module 840. The backlight module 840 produces light that is transmitted through the pixel array substrate 810, liquid crystal layer 830, and opposite substrate 820. However, if the LCD device 800 is a reflective LCD, then the backlight module 840 may be omitted.

As discussed above, although the structural design of the common line may change, the alignment direction of the alignment layer and the extending direction of the common line capacitor portion can be arranged to be substantially perpendicular to each other.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A pixel structure to be disposed on a substrate of a display device, comprising:
    a common line having a capacitor portion;
    an active device;
    a pixel electrode electrically connected to the active device, and covering the capacitor portion; and
    an alignment layer covering at least the common line, wherein the alignment layer has an alignment direction, and the capacitor portion extends along a first direction that is substantially perpendicular to the alignment direction, and wherein the first direction extends diagonally with respect to a side edge of the pixel electrode.

2. The pixel structure of claim 1, wherein a fringe of the capacitor portion extends along the first direction.

3. The pixel structure of claim 1, further comprising a data line extending along a second direction, and a scan line extending along a third direction, wherein an angle between the second direction and the first direction is substantially equal to 45°, and wherein the second direction is substantially perpendicular to the third direction.

4. The pixel structure of claim 1, wherein the active device comprises a thin film transistor.

5. The pixel structure of claim 1, wherein the alignment layer is to pre-tilt liquid crystal molecules of a liquid crystal layer in the display device.

6. A pixel array substrate, comprising:
a first substrate;
a plurality of data lines disposed on the first substrate;
a plurality of scan lines disposed on the first substrate, wherein the data lines and the scan lines define a plurality of pixel areas;
a plurality of common lines disposed on the first substrate, the common lines comprising corresponding capacitor portions and corresponding connector portions, wherein the capacitor portions are disposed in corresponding pixel areas, and the connector portions connect adjacent capacitor portions;
a plurality of active devices disposed on the first substrate and electrically connected to the data lines and the scan lines;
a plurality of pixel electrodes disposed in the pixel areas, and electrically connected to corresponding active devices, the pixel electrodes covering corresponding capacitor portions; and
an alignment layer disposed on the first substrate and covering the data lines, the scan lines, the common lines, the active devices, and the pixel electrodes, wherein the alignment layer has an alignment direction, the capacitor portions extend along a first direction, and the alignment direction is substantially perpendicular to the first direction, and wherein the alignment direction extends diagonally with respect to side edges of the respective pixel electrodes.

7. The pixel array substrate of claim 6, wherein fringes of the capacitor portions extend along the first direction.

8. The pixel array substrate of claim 6, wherein the data lines extend along a second direction, the scan lines extend along a third direction, and an angle between the second direction and the first direction is substantially equal to 45°, and the second direction is substantially perpendicularly to the third direction.

9. The pixel array substrate of claim 8, wherein each of the connector portions comprises:
a first connector portion crossing the data line in the same pixel area; and
two second connector portions, respectively disposed on two sides of the data line in the same pixel area, and the second connector portions extending along the second direction, wherein ends of the first connector portion are respectively connected to the second connector portions, and the second connector portions are respectively connected to adjacent capacitor portions.

10. A pixel array substrate, comprising:
a first substrate;
a plurality of data lines disposed on the first substrate;
a plurality of scan lines disposed on the first substrate, wherein the data lines and the scan lines define a plurality of pixel areas;
a plurality of common lines disposed on the first substrate, the common lines comprising corresponding capacitor portions and corresponding connector portions, wherein the capacitor portions are disposed in corresponding pixel areas, and the connector portions connect adjacent capacitor portions;
a plurality of active devices disposed on the first substrate and electrically connected to the data lines and the scan lines;
a plurality of pixel electrodes disposed in the pixel areas, and electrically connected to corresponding active devices, the pixel electrodes covering corresponding capacitor portions; and
an alignment layer disposed on the first substrate and covering the data lines, the scan lines, the common lines, the active devices, and the pixel electrodes, wherein the alignment layer has an alignment direction, the capacitor portions extend along a first direction, and the alignment direction is substantially perpendicular to the first direction, and
wherein the data lines extend along a second direction, the scan lines extend along a third direction, and an angle between the second direction and the first direction is substantially equal to 45°, and the second direction is substantially perpendicularly to the third direction,
wherein each of the connector portions comprises:
a first connector portion crossing the data line in the same pixel area; and
a second connector portion, wherein ends of the second connector portion are respectively connected to another first connector portion of an adjacent pixel area and the capacitor portion of the same pixel area, and the second connector portion extending along the second direction, and ends of the first connector portion are respectively connected to another second connector portion of another adjacent pixel area and the capacitor portion of the same pixel areas.

11. A liquid crystal display (LCD) device, comprising:
a pixel array substrate, comprising:
a first substrate;
a plurality of data lines disposed on the first substrate;
a plurality of scan lines disposed on the first substrate, wherein the data lines and the scan lines define a plurality of pixel areas;
a plurality of common lines disposed on the first substrate, the common lines comprising corresponding capacitor portions and corresponding connector portions, wherein the capacitor portions are disposed in corresponding pixel areas, and the connector portions connect adjacent capacitor portions;
a plurality of active devices disposed on the first substrate, and electrically connected to the data lines and the scan lines;
a plurality of pixel electrodes disposed in the pixel areas and electrically connected to corresponding active devices, the pixel electrodes covering corresponding capacitor portions;
a first alignment layer disposed on the first substrate, wherein the first alignment layer has a first alignment direction, the capacitor portions extend along a first direction, and the first alignment direction is substantially perpendicular to the first direction, and wherein the first direction extends diagonally with respect to side edges of the respective pixel electrodes;
an opposite substrate; and
a liquid crystal layer disposed between the opposite substrate and the pixel array substrate.

12. The LCD device of claim 11, wherein fringes of the capacitor portions extend along the first direction.

13. The LCD device of claim 11, wherein the data lines extend along a second direction, the scan lines extend along a third direction, an angle between the second direction and first direction is substantially equal to 45°, and the second direction is substantially perpendicular to the third direction.

14. The LCD device of claim 13, wherein each of the connector portions comprises:
a first connector portion crossing the data line in the same pixel area; and
two second connector portions, respectively disposed on two sides of the data line in the same pixel area, and the two second connector portions extending along the second direction, wherein ends of the first connector portion are respectively connected to the second connector portions, and the second connector portions are respectively connected to the adjacent capacitor portion.

15. The LCD device of claim 11, further comprising a backlight module to produce light to pass through the pixel array substrate, the opposite substrate, and the liquid crystal layer.

16. The LCD device of claim 11, wherein the opposite substrate has a second alignment layer contacting the liquid crystal layer, the second alignment layer has a second alignment direction, and the first alignment direction is substantially perpendicular to the second alignment direction.

17. The LCD device of claim 11, wherein the first alignment layer is to pre-tilt liquid crystal molecules in the liquid crystal layer along the first alignment direction.

18. A liquid crystal display (LCD) device, comprising:
a pixel array substrate, comprising:
a first substrate;
a plurality of data lines disposed on the first substrate;
a plurality of scan lines disposed on the first substrate, wherein the data lines and the scan lines define a plurality of pixel areas;
a plurality of common lines disposed on the first substrate, the common lines comprising corresponding capacitor portions and corresponding connector portions, wherein the capacitor portions are disposed in corresponding pixel areas, and the connector portions connect adjacent capacitor portions;
a plurality of active devices disposed on the first substrate, and electrically connected to the data lines and the scan lines;
a plurality of pixel electrodes disposed in the pixel areas and electrically connected to corresponding active devices, the pixel electrodes covering corresponding capacitor portions;
a first alignment layer disposed on the first substrate, wherein the first alignment layer has a first alignment direction, the capacitor portions extend along a first direction, and the first alignment direction is substantially perpendicular to the first direction,
wherein the data lines extend along a second direction, the scan lines extend along a third direction, an angle between the second direction and first direction is substantially equal to 45°, and the second direction is substantially perpendicular to the third direction,
wherein each of the connector portions comprises:
a first connector portion crossing the data line in the same pixel area; and
a second connector portion, wherein ends of the second connector portion are respectively connected to another first connector portion of an adjacent pixel area and the capacitor portion of the same pixel area, and the second connector portion extends along the second direction, and ends of the first connector portion are respectively connected to another second connector portion of another adjacent pixel area and the capacitor portion of the same pixel area;
an opposite substrate; and
a liquid crystal layer disposed between the opposite substrate and the pixel array substrate.

* * * * *